United States Patent [19]
Ludwick

[11] 3,810,490
[45] May 14, 1974

[54] HOSE SUPPORT
[76] Inventor: Ralph Ludwick, 133 Gen. Lee Dr., Vivian, La. 71082
[22] Filed: Oct. 30, 1972
[21] Appl. No.: 302,065

[52] U.S. Cl. ............ 138/106, 138/107, 138/110
[51] Int. Cl. ............................................. F16l 3/02
[58] Field of Search ........... 138/106, 107, 110, 113, 138/118, 119

[56] References Cited
UNITED STATES PATENTS
3,143,146  8/1964  Kennedy ........................... 138/107
3,730,228  5/1973  Gibbs .................................. 138/106

Primary Examiner—James J. Gill
Assistant Examiner—Anthony V. Ciarlante
Attorney, Agent, or Firm—John M. Harrison

[57] ABSTRACT

A hose support for maintaining drain hoses in the proper attitude and length to facilitate draining, which includes two L-shaped support collars and an upper support which are clamped to the hose in order to provide the necessary support.

10 Claims, 4 Drawing Figures

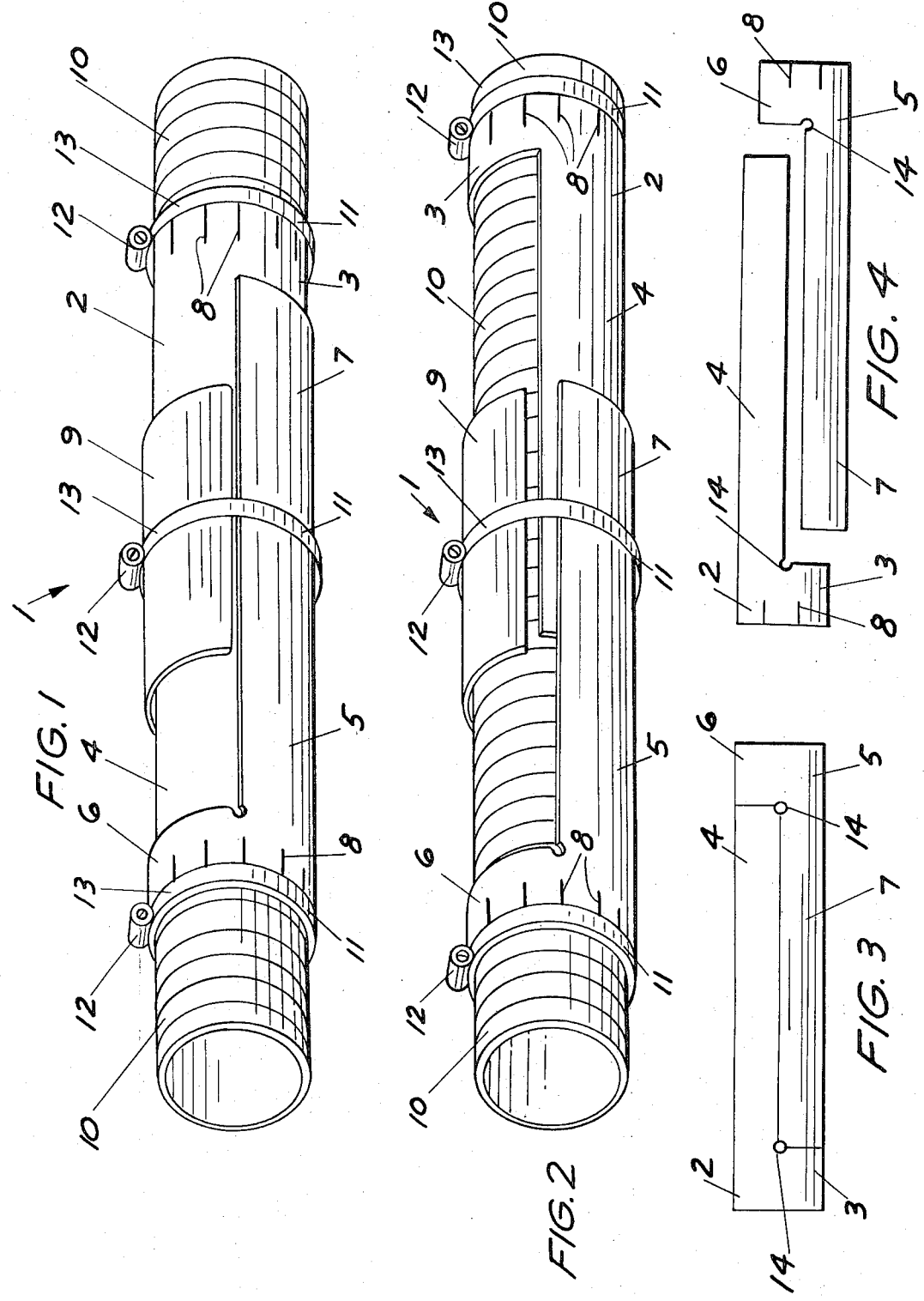

HOSE SUPPORT

BACKGROUND OF THE INVENTION

1. Field of the Invention

This invention relates to a new and improved hose support which may be used to maintain substantially any drain hose in the proper attitude to facilitate drainage. The device is constructed from two L-shaped collars which are of substantially the same size and shape, one of which may be rotated 180° with respect to the other in order to provide a convenient and compact carrying case for the drain hose when the hose support is not in use. While the hose support of this invention may be utilized in many applications it is primarily designed to provide support for sewage and waste water hoses used in the drainage of holding tanks in travel trailers and other recreational vehicles.

2. Description of the Prior Art

Heretofore there have been developed many different types of hose supports and stiffeners used to facilitate the drainage and fluid flow in hoses of various size and description. More particularly, the hoses used to drain waste water and sewage from recreational vehicles have typically been formed of vinyl plastic reinforced with a coil of wire in such a manner as to allow the hose to be flexible. These hoses are normally carried in the recreational vehicle and are used when the vehicle is parked in a camp where facilities are available for its use. The hose must be flexible in order to compensate for varying distances between the recreational vehicle and the sewage disposal facilities located at the camp. Typical of the hose supports found in the prior art for maintaining the proper flow characteristic in such hoses are those consisting of wire supports which are adjustable or are composed of many lengths, each of which may be either added to or taken from the wire structure. Other supports simply consist of metal troughs which are adjustable in order to facilitate support over varying hose lengths. These types of hose supports are almost always characterized by ground supports which depend upon even terrain to be properly functional. Perhaps the most common method of supporting such drain hoses are by the use of blocks of wood or bricks which are found at the camp sites; such use, of course, depends upon the contingency of finding the proper materials for supporting the hose wherever one happens to desire to camp.

An inherent disadvantage of many of the prior art hose supports is the lack of mobility, compactness and ease of assembly and disassembly. For example, the wire hose supports must be taken apart and then reassembled at each camping location and the parts are easily lost or bent in the process. The trough-type metal hose supports are frequently bulky and difficult to store in the recreational vehicle where space is at a premium.

Accordingly, an object of this invention is to provide a hose support for substantially any hose where proper drain characteristics are needed and particularly for waste water and sewage hose used in recreational vehicles.

Another object of this invention is to provide a hose support which provides positive support with a selected, uniform drop from the flexible hose drain in a recreational vehicle holding tank to a sewer line inlet.

Yet another object of this invention is to provide a hose support which will facilitate drainage of the hose in order to prevent liquid and solid build-up in the hose.

Another object of the invention is to provide a hose support which permits drainage of the hose in the shortest possible time thereby eliminating or minimizing odor and maintaining maximum sanitary conditions.

Still another object of the invention is to provide a hose support which spans uneven and irregular terrain and does not depend upon contact with the ground for support.

A still further object of the invention is to provide a hose support which is adjustable and is capable of supporting a drain hose over a substantially long span between the recreational vehicle holding tank outlet and the sewage inlet.

A still further object of the invention is to provide a hose support which may be easily and quickly converted into a compact carrying case for the drain hose, which case is easily stored in the recreational vehicle.

SUMMARY OF THE INVENTION

These and other objects of the invention are provided in a hose support, and particularly a hose support designed to facilitate drainage of waste water and/or sewage from a recreational vehicle, which includes a pair of support collars, each having a collar ring and a support leg and each being substantially the same size and shape as the other, in cooperation with an upper support which is designed to fit on the top of the hose and to be clamped to the hose and the support collars by means of a hose clamp. The hose may be further secured to the hose support by means of additional hose clamps positioned around the collar of the hose support and tightened to snugly enclose the hose. When it is desired to move the recreational vehicle the hose clamps may be loosened, one support collar rotated 180° with respect to the other to form a tube, and the hose collapsed within the tube and secured by the hose clamps to form a compact package which may be easily stored in the recreational vehicle until it is needed again.

BRIEF DESCRIPTION OF THE DRAWINGS

The invention will be better understood in view of the following description presented with reference to the accompanying drawing:

FIG. 1 is a perspective view of the hose support of this invention showing the support collars interrelated to form a tube and carrying case for the hose while the hose is not in use;

FIG. 2 is another perspective view of the hose support illustrating the hose support in use carrying the hose;

FIG. 3 further illustrates the carrying and storage feature of the hose support; and FIG. 4 further illustrates the relationship of the right support collar and the left support collar in forming the convenient carrying case.

DESCRIPTION OF THE PREFERRED EMBODIMENTS

Referring now to FIG. 1 of the drawings, the hose support of this invention is illustrated generally be reference numeral 1 with right support collar 2 and left support collar 5 shown in interlocking relationship to provide a carrying case and storage container for hose 10. While the hose is thus stored, upper support 9 is simply positioned on the top of right support collar 2 and secured in place by hose clamp 11. Similarly, hose 10 is collapsed within the tube formed by right support collar 2 and left support collar 5, and held in place by hose clamps 11. It will be noted that while hose clamps 11 are adapted to be tightened by means of a screw driver manipulating hose clamp screws 12 along hose clamp slots 13, substantially any type of clamp known to those skilled in the art may be utilized in the invention to perform the necessary function. It will be further noted that right support collar 2 includes right support collar ring 3 and right support collar leg 4 which are of sufficient size and diameter to snugly fit hose 10. Likewise, left support collar 5 is made up of left support collar ring 6 and left support collar leg 7, which in cooperation with right support collar 2, forms the tube which encloses hose 10.

FIG. 2 illustrates the carrying and support feature of the invention wherein hose clamps 11 have been loosened and right support collar 2 rotated 180 degrees with respect to left support collar 5 to form the hose support of this invention. Right support collar 2 and left support collar 5 are adjusted lengthwise with respect to each other until the desired distance between the recreational vehicle and the sewage inlet point is spanned, and hose clamps 11 are then tightened to provide the necessary support. As noted in FIG. 2, upper support 9 must be positioned above right support collar leg 4 and left support collar leg 7 in order to prevent sagging of the hose support and to provide the necessary positive positioning of hose 10.

As illustrated in FIGS. 1 and 2, right support collar 2 and left support collar 5 may be fitted with slots 8 in order to facilitate clamping of right support collar ring 3 and left support collar ring 6 against hose 10 by hose clamps 11. Furthermore, right support collar ring 3 and left support collar ring 6 may be cut completely through in order to facilitate adjustment to a hose having a larger diameter than the rings themselves.

FIGS. 3 and 4 of the drawings simply illustrate the relationship between right support collar 2 and left support collar 5 showing that these support collars may be cut from a single piece of tubing to facilitate manufacture, utilizing holes 14 bored before the cutting operation. It should be further noted that upper support 9 may be cut from a similar piece of tubing and performs its function quite effectively when such tubing is cut into three pieces, each piece serving as an upper support.

It should be further appreciated that in order to facilitate expansion and contraction of hose 10 inside right support collar ring 3 and left support collar ring 6 may be beveled. In the event the drain hose 10 is damaged or leaks, hose clamps 11 may be simply loosened, the length of hose removed, and a new length inserted for use quickly and easily.

In operation, when it is desired to convert the hose support of this invention from the carrying configuration illustrated in FIG. 1 to the support configuration shown in FIG. 2, the tube formed by right support collar 2 and left support collar 5 as illustrated in FIG. 1 is simply removed from the recreational vehicle, hose clamps 11 loosened, right support collar 2 rotated 180 degrees with respect to left support collar 5, hose 10 and the two support collars extended to the desired span, and hose clamps 11 again tightened in order to provide the necessary support. Fittings connecting hose 10 to the holding tank of the recreational vehicle and to the sewage inlet facilities are not illustrated in the drawing, and may be either quickly and easily assembled on hose 10 or simply left on hose 10 while it is stored in the hose support. The support may be quickly and easily converted from the carrying configuration to the use configuration, and may be constructed of substantially any material, a preferred material being plastic which is resistent to impact and corrosion, and is light in weight. The support takes up a minimum of space when packed in the storage configuration and is composed of a minimum of parts to facilitate ease of assembly and disassembly and to minimize loss.

Accordingly, from a consideration of the above described embodiments of the invention it will be recognized by those skilled in the art that the hose support of this invention hrein disclosed is characterized by many useful features inherent in the design of the device which is not found in conventional hose support devices. Although the invention has been disclosed with a certain degree of particularity it will be understood that the illustrations presented are only by way of example and the invention is to be limited only as defined in the claims.

What is claimed is:

1. A hose support comprising:
   a. a right support collar having a first ring at one end thereof and a first supporting leg in the farm of a semicylinder carried by said first ring;
   b. a left support collar having essentially the same shape as said right support collar, and having a second ring at one end thereof and a second supporting leg carried by said second ring, said first supporting leg and said second supporting leg being positioned adjacent each other in overlapping and slidable relationship to carry a hose positioned concentrically inside said first ring and said second ring;
   c. an upper support adapted to fit on the top of said hose above said first supporting leg and said second supporting leg at essentially the area of overlap of said first supporting leg and said second supporting leg; and
   d. means in cooperation with said first supporting leg, said second supporting leg and said upper support for securing said first supporting leg, said second supporting leg and said upper support to said hose.

2. The hose support of claim 1 further comprising at least one slot in said first ring and said second ring and means in cooperation with said first ring and said second ring and said at least one slot for securing said first ring and said second ring to said hose.

3. The hose support of claim 1 wherein said means in cooperation with said first supporting leg, said second supporting leg and said upper support is a hose clamp.

4. The hose support of claim 2 wherein said at least one slot is a plurality of slots and said means in cooperation with said first ring and said second ring and said slots is a hose clamp.

5. The hose support of claim 1 wherein:
   a. Said means in cooperation with said first supporting leg, said second supporting leg and said upper support is a hose clamp;

b. Said first ring and said second ring are fitted with a plurality of slots; and c. Said means in cooperation with said first ring and said second ring and said slots is a hose clamp.

6. The hose support of claim 1 wherein said right support collar and said left support collar form a tube when either said right support collar or said left support collar is rotated 180° with respect to said right support collar or said left support collar from a position where said first supporting leg is adjacent and overlapping said second supporting leg.

7. The hose support of claim 6 wherein said hose is carried by said tube when said hose support is not in use.

8. The hose support of claim 7 further comprising at least one slot in said first ring and said second ring and means in cooperation with said first ring and said second ring for securing said first ring and said second ring to said hose to facilitate storage of said hose inside said tube.

9. The hose support of claim 8 wherein said at least one slot is a plurality of slots and said means in cooperation with said first ring and said second ring is a hose clamp.

10. The hose support of claim 9 further comprising said upper support in position on said tube and a hose clamp in cooperation with said upper support and said tube to hold said upper support on said tube while said hose support is not in use.

* * * * *